(12) United States Patent
Nakayama et al.

(10) Patent No.: US 11,204,056 B2
(45) Date of Patent: Dec. 21, 2021

(54) NUT

(71) Applicant: SMC CORPORATION, Chiyoda-ku (JP)

(72) Inventors: Toru Nakayama, Soka (JP); Ryuichi Masui, Bando (JP); Naohiro Ishizawa, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 251 days.

(21) Appl. No.: 16/314,198

(22) PCT Filed: Apr. 6, 2017

(86) PCT No.: PCT/JP2017/014363
§ 371 (c)(1),
(2) Date: Dec. 28, 2018

(87) PCT Pub. No.: WO2018/003226
PCT Pub. Date: Jan. 4, 2018

(65) Prior Publication Data
US 2019/0226516 A1 Jul. 25, 2019

(30) Foreign Application Priority Data

Jun. 30, 2016 (JP) .............................. JP2016-129654
Jan. 31, 2017 (JP) .............................. JP2017-015336

(51) Int. Cl.
*F16B 37/02* (2006.01)
*F16H 25/24* (2006.01)
*F16B 37/12* (2006.01)

(52) U.S. Cl.
CPC ............. *F16B 37/02* (2013.01); *F16H 25/24* (2013.01); *F16B 37/12* (2013.01)

(58) Field of Classification Search
CPC .......... F16B 37/02; F16B 37/12; F16B 39/30; F16H 25/24; F16H 2025/2481; F16H 25/2003; F16H 25/2209
(Continued)

(56) References Cited

U.S. PATENT DOCUMENTS 3,233,262 A * 2/1966 Vollman ................. F16B 39/28
470/19
4,383,787 A * 5/1983 Reynolds ............... F16B 37/12
29/446

(Continued)

FOREIGN PATENT DOCUMENTS

GB 609234 A 9/1948
JP 58-96112 U 6/1983
(Continued)

OTHER PUBLICATIONS

International Search Report dated Jul. 4, 2017 in PCT/JP2017/014363 filed Apr. 6, 2017.

(Continued)

*Primary Examiner* — Victor D Batson
*Assistant Examiner* — Amit Singh Dhillon
(74) *Attorney, Agent, or Firm* — Oblon, McClelland, Maier, Neustadt, L.L.P.

(57) ABSTRACT

A layered nut (10) comprises a plurality of thin nuts (12) formed with through-holes (16) having almost the same diameter. On the inner peripheral surface of each thin nut (12), a plurality of screw threads (18, 38) are formed at predetermined angular spacing so as to protrude toward the inside of the through-hole (16). In this case, the thin nuts (12) are layered along the direction of the central axis (14) so that the through-holes (16) become approximately coaxial. The outer peripheral surfaces of the layered thin nuts (12) are subjected to laser welding or the like, thereby (Continued)

joining the thin nuts (12) and completing the layered nut (10).

8 Claims, 8 Drawing Sheets

(58) Field of Classification Search
USPC .......................................................... 74/89.42
See application file for complete search history.

(56) References Cited

U.S. PATENT DOCUMENTS

| | | | | |
|---|---|---|---|---|
| 4,940,377 | A * | 7/1990 | Reynolds | ............... B21D 53/24 |
| | | | | 411/222 |
| 5,017,079 | A * | 5/1991 | Reynolds | ............ F16B 23/0061 |
| | | | | 411/402 |
| 5,049,017 | A * | 9/1991 | Reynolds | ............... F16B 39/284 |
| | | | | 411/432 |
| 5,139,380 | A | 8/1992 | Reynolds | |
| 5,785,477 | A * | 7/1998 | McGuffey | ............... F16B 37/02 |
| | | | | 411/432 |
| 2008/0193259 | A1 * | 8/2008 | Hill | ......................... F16B 37/00 |
| | | | | 411/533 |
| 2008/0247842 | A1 * | 10/2008 | Motsch | ................... F16B 37/02 |
| | | | | 411/174 |
| 2010/0272539 | A1 * | 10/2010 | Park | ........................ F16B 37/12 |
| | | | | 411/438 |

FOREIGN PATENT DOCUMENTS

| | | |
|---|---|---|
| JP | 6-81828 A | 3/1994 |
| JP | 7-224826 A | 8/1995 |
| JP | 9-242841 A | 9/1997 |
| JP | 9-317741 A | 12/1997 |
| JP | 11-82459 A | 3/1999 |
| JP | 3100223 U | 5/2004 |
| JP | 2005-114044 A | 4/2005 |
| JP | 2006-346704 A | 12/2006 |

OTHER PUBLICATIONS

Indian Office Action dated Apr. 29, 2020 in Patent Application No. 201947003314 (with English translation), 7 pages.

* cited by examiner

NUT

TECHNICAL FIELD

The present invention relates to a nut used in a feed screw nut and the like of an electric actuator.

BACKGROUND ART

For example, as shown in FIG. 7, in a case where a feed screw shaft 52 is rotationally driven by a motor (not shown) in an electric actuator 50 for transporting a workpiece, a feed screw nut 54 in screw-engagement with the feed screw shaft 52 is slid in the axial direction of the feed screw shaft 52 under the rotational action of the feed screw shaft 52. Incidentally, since the electric actuator 50 is well-known, the detailed description thereof is omitted.

By the way, the screw machining on the feed screw nut 54 is performed by cutting with, for example, a tap or an external threading tool. Incidentally, conventional nut manufacturing methods including cutting are disclosed in Japanese Laid-Open Patent Publications No. 06-081828, No. 07-224826, No. 09-242841, No. 09-317741, No. 11-082459, No. 2006-346704 and Japanese Utility Model Registration No. 3100223.

SUMMARY OF INVENTION

However, as shown in FIGS. 7 and 8, since the conventional feed screw nut 54 is manufactured as a single component as a whole of the nut, such a nut is manufactured separately for each of specifications such as thread length and the like, so that individual controls are required.

Further, since cutting tools such as a tap, an external threading tool or the like is used for manufacturing, the thread length of the feed screw nut 54 is limited by the length of the cutting tool. Furthermore, in the case where a surface treatment for forming a protective coating on a threaded portion 56 of the feed screw nut 54 is performed for the purpose of wear reduction and improvement of slidability, difficulty arises in controlling the thickness of the protective coating at a center portion of the threaded portion 56.

Further, the manufacturing cost for the feed screw nut 54 increases in proportion to a cutting amount in cutting a workpiece into the feed screw nut 54. For example, in a case where the threaded portion 56 of a multi-start thread is formed, particularly in cutting with an external threading tool, the cutting tool is required to be reciprocatively moved as many times as the number of screw threads. Thus, it takes a long time to cut such a nut, resulting in the increased manufacturing cost.

The present invention has been made in order to solve the foregoing problems, and it is an object of the present invention to provide a nut which can be easily controlled and which is capable of being manufactured at a low cost by reduction of machining time.

In order to achieve the foregoing object, a nut according to the present invention includes a plurality of plate-shaped members having through holes whose diameters are substantially the same, wherein each of the plate-shaped members has a plurality of screw threads arranged at predetermined angular intervals, the screw threads protruding inward of the through hole and wherein the plate-shaped members are laminated so that the through holes are substantially coaxial with each other.

With this configuration, the nut is formed by laminating the plate-shaped members each having screw threads that protrude inward of the through hole. Therefore, according to the present invention, because no cutting step is required, it is possible to reduce the machining time and to reduce the manufacturing cost.

To explain the aforementioned advantageous effects in more detail, instead of the conventional method in which the thread length depends on the feed amount in cutting, the nut can easily be assembled by laminating as many plate-shaped members as the number corresponding to a required thread length, in the present invention. Therefore, from one type of plate-shaped member, it is possible to obtain nuts having various thread lengths as necessary. Incidentally, the plate-shaped members can be manufactured by forming the through hole and the screw threads through plastic deformation such as pressing or the like.

Further, in the present invention, since the thread length is not restricted by the length of a cutting tool, it is possible to manufacture the nut by laminating a required number of the plate-shaped members. Furthermore, since a protective coating can be formed on each of the plate-shaped members, the thickness of the protective coating becomes easy to control.

With the aforementioned configuration, according to the present invention, the nuts become easy to control, and the machining time is reduced, so that it is possible to manufacture the nut at a low cost.

Here, in the present invention, it is preferable that the screw threads are screw threads of a multi-start thread and that, in each of the plate-shaped members, spaces are formed between the screw threads so that the screw threads do not mutually overlap in the axial direction of the nut. Thus, it is possible to form the screw threads by plastically deforming a workpiece into the plate-shaped member.

In this case, as long as the thickness of each of the plate-shaped members is equal to or less than a thread pitch of each of the screw threads, it is possible to easily form the screw thread.

Further, in the present invention, the plate-shaped members are joined together. Thus, the nut having a thread length sufficient to function as a feed screw nut can easily be obtained.

Specifically, it is preferable that outer peripheral portions of the plate-shaped members be joined together in a state that the plate-shaped members are laminated so that screw threads of the plate-shaped members are continuously connected in the axial direction of the nut.

Further, when the plate-shaped members are joined together in a state that a jig with a male thread formed thereon is screw-engaged with the screw threads, it is possible to manufacture the nut while the thread pitch is controlled at a satisfactory accuracy.

In this case, it is preferable that the plate-shaped members be laminated without any gap on the jig in the axial direction by the screw threads being screw-engaged with the male thread. Therefore, it is possible to accurately manufacture the nut without any backlash.

Further, in order that a backlash formed between the nut and a screw shaft of an object when the nut is screw-engaged with the screw shaft is adjusted to a predetermined backlash in accordance with specifications of the object, it is preferable that the screw threads be screw-engaged with a male thread of one jig of a plurality of the jigs and the plate-shaped members be laminated without any gap relative to the one jig. Even in this case, it is possible to accurately manufacture the nut in a backlashless state. Further, the nut can be manufactured by selecting an appropriate jig in accordance with the specifications of the object (for example, the specifications of an electric actuator into which the nut is incorporated as a feed screw nut), and by screw-engaging the plate-shaped members with a male thread of the selected jig. Thus, when the nut manufactured is screw-engaged with the screw shaft of the object (a feed screw shaft of the electric actuator), it is possible to adjust the backlash formed between the nut and the screw shaft to a predetermined backlash (for example, optimum backlash) in accordance with the specifications.

Then, by joining the plate-shaped members by welding, the aforementioned nut can easily be obtained.

DESCRIPTION OF EMBODIMENTS

A preferred embodiment of a nut according to the present invention will be described in detail with reference to the drawings.

Configuration of Embodiment

Figure 1:
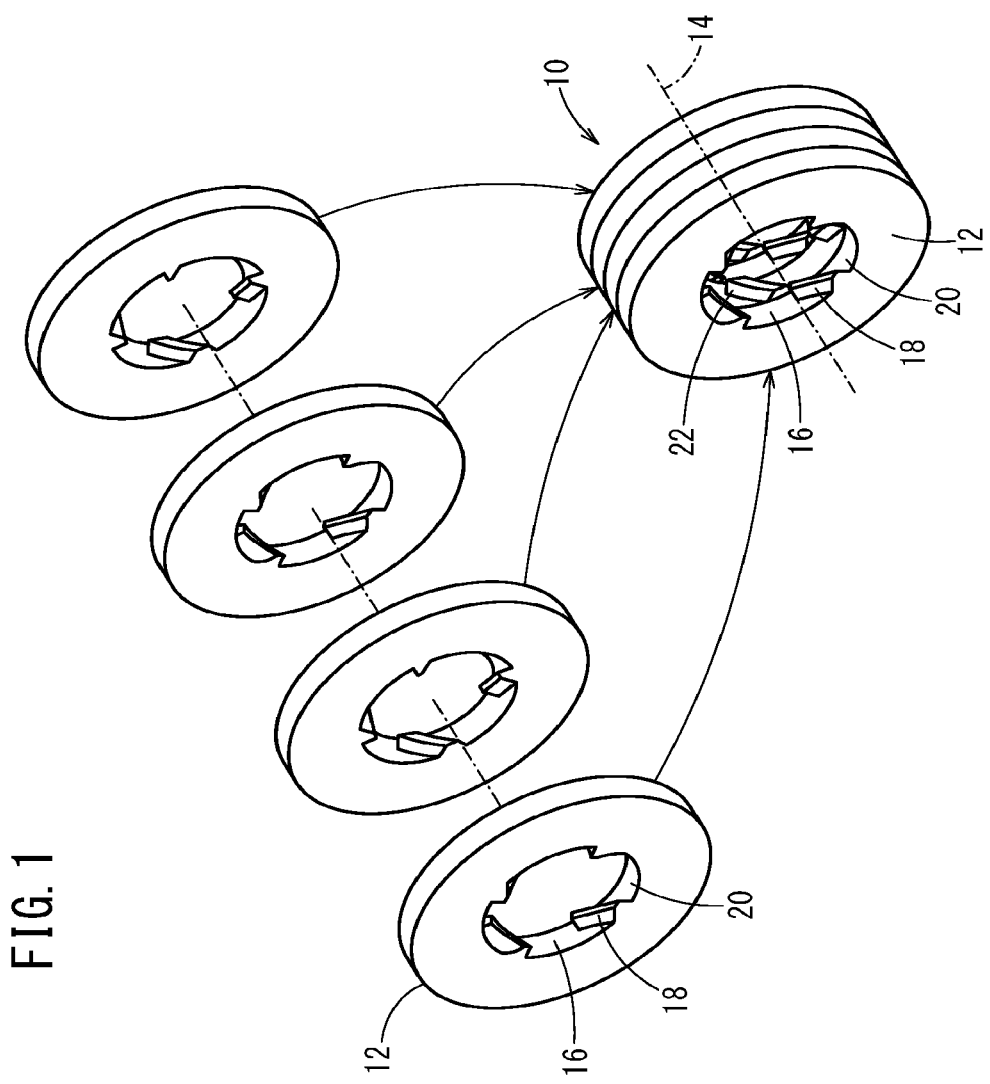
FIG. 1 is a perspective view illustrating the assembling of a laminated nut according to an embodiment of the present invention.
Figure 2:
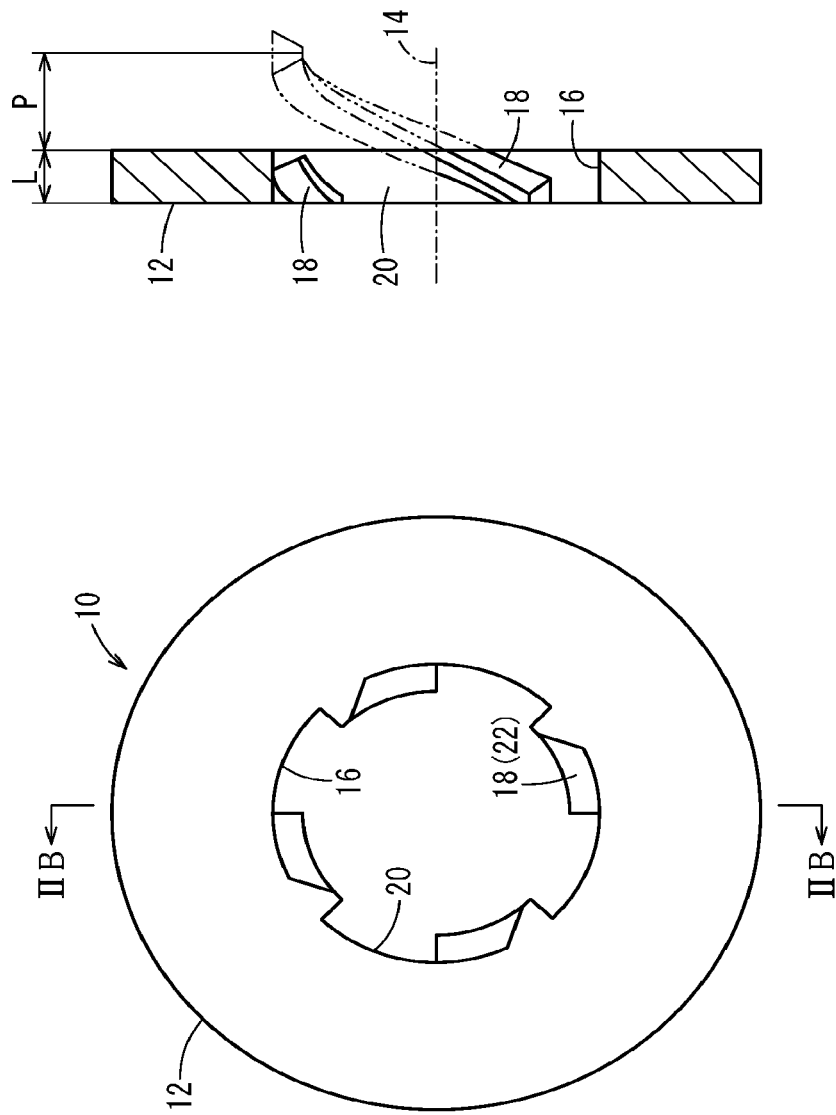
FIG. 2A is a front view of a thinned nut in FIG. 1.
FIG. 2B is a sectional view taken along line IIB-IIB in FIG. 2A.
Figure 3:
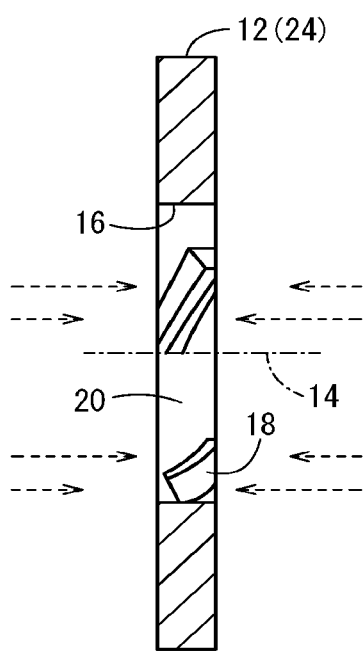
FIG. 3 is a sectional view illustrating formation of a threaded portion of the thinned nut.

As shown in FIGS. 1 to 3, a nut 10 according to the present embodiment is manufactured by laminating plate-shaped members 12 made of a metal such as aluminum or the like and having substantially the same shape, in a direction along a center axis 14 (axial direction) and by joining outer peripheral portions of the plate-shaped members 12 after lamination by welding such as laser welding or the like. Incidentally, in some cases, the plate-shaped member 12, which is thinner than the nut 10, will be called a thinned nut 12, while the nut 10 formed by laminating a plurality of the thinned nuts 12 will be called a laminated nut 10.

The thinned nut 12 is a washer-shaped (ring-shaped) thinned member having a through hole 16. On an inner peripheral surface of the thinned nut 12, a plurality of screw threads 18 are arranged at predetermined angular intervals to protrude inward of the through hole 16. Incidentally, FIGS. 1 to 3 illustrate, as one example, a case where four screw threads 18 are formed at intervals of approximately 90 degrees.

Each screw thread 18 is a multi-start screw thread. Further, spaces 20 are formed between the screw threads 18 formed at the predetermined angular intervals. In this case, as viewed in the section of FIG. 2B, in each of the thinned nut 12, spaces 20 are formed such that the screw threads 18 do not overlap with one another in the direction along the center axis 14.

Further, in the present embodiment, the thinned nuts 12 are laminated by superimposing the thinned nuts 12 in the direction of the center axis 14 with the phases of the screw threads 18 being shifted from each other so that the screw threads 18 of the adjoining thinned nuts 12 are continuously connected to each other. In this case, the thickness L of the thinned nut 12 is set to be equal to or less than a thread pitch P of (each screw thread 18 of) a threaded portion 22 configured by laminating the thinned nuts 12. Incidentally, in the present embodiment, there is illustrated as an example a case where the number of threads is four and L=P/2 (half pitch).

Then, as shown in FIG. 3, in a plate-shaped workpiece 24, a compressive force is exerted on the workpiece 24 by pressing or the like from right and left directions along the center axis 14, and thus, the through hole 16 and the screw threads 18 are formed, whereby the thinned nut 12 is manufactured. In FIG. 3, the compressive forces are applied along arrows of broken lines.

Figure 4A:
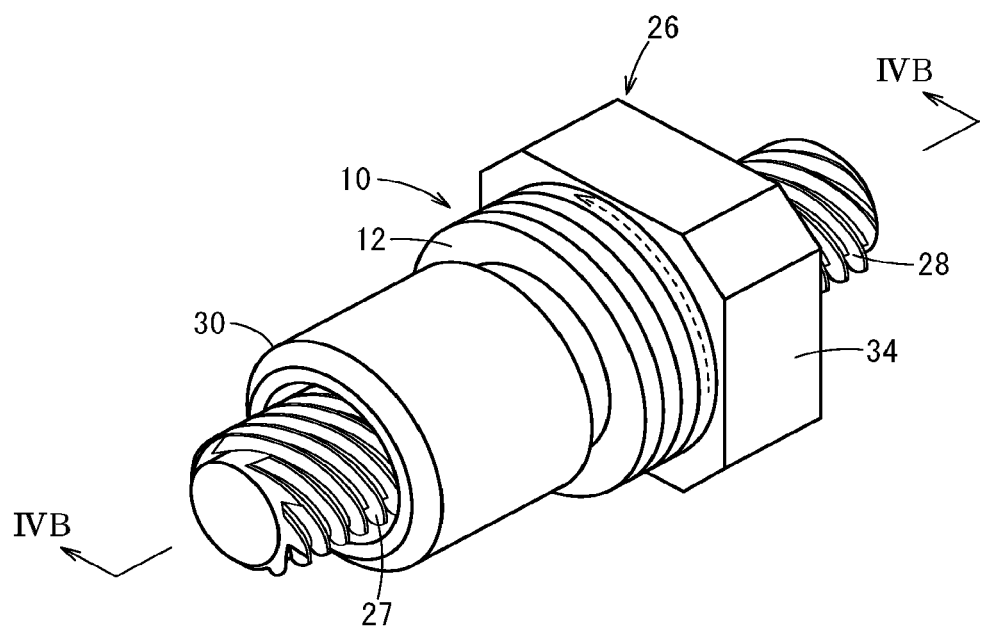
FIG. 4A is a perspective view illustrating the case where the laminated nut is manufactured by using a pitch control jig.
Figure 4B:
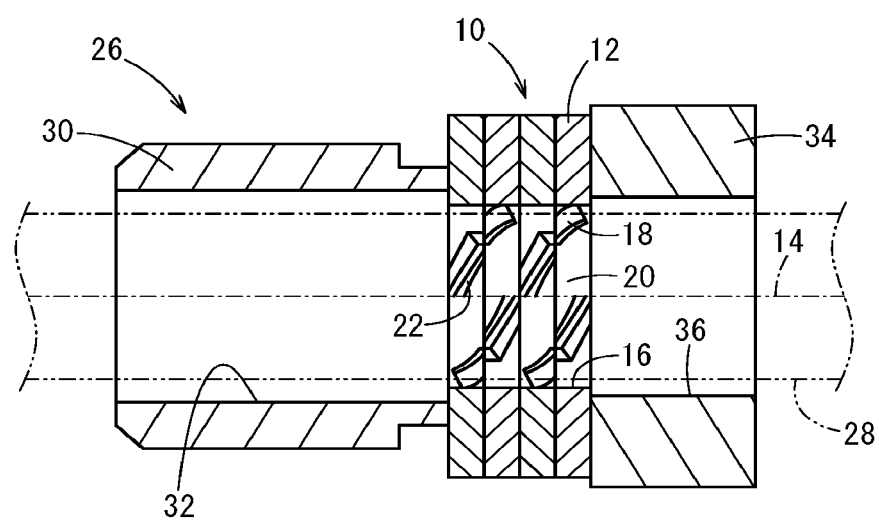
FIG. 4B is a sectional view taken along line IVB-IVB in FIG. 4A.
Figure 7:
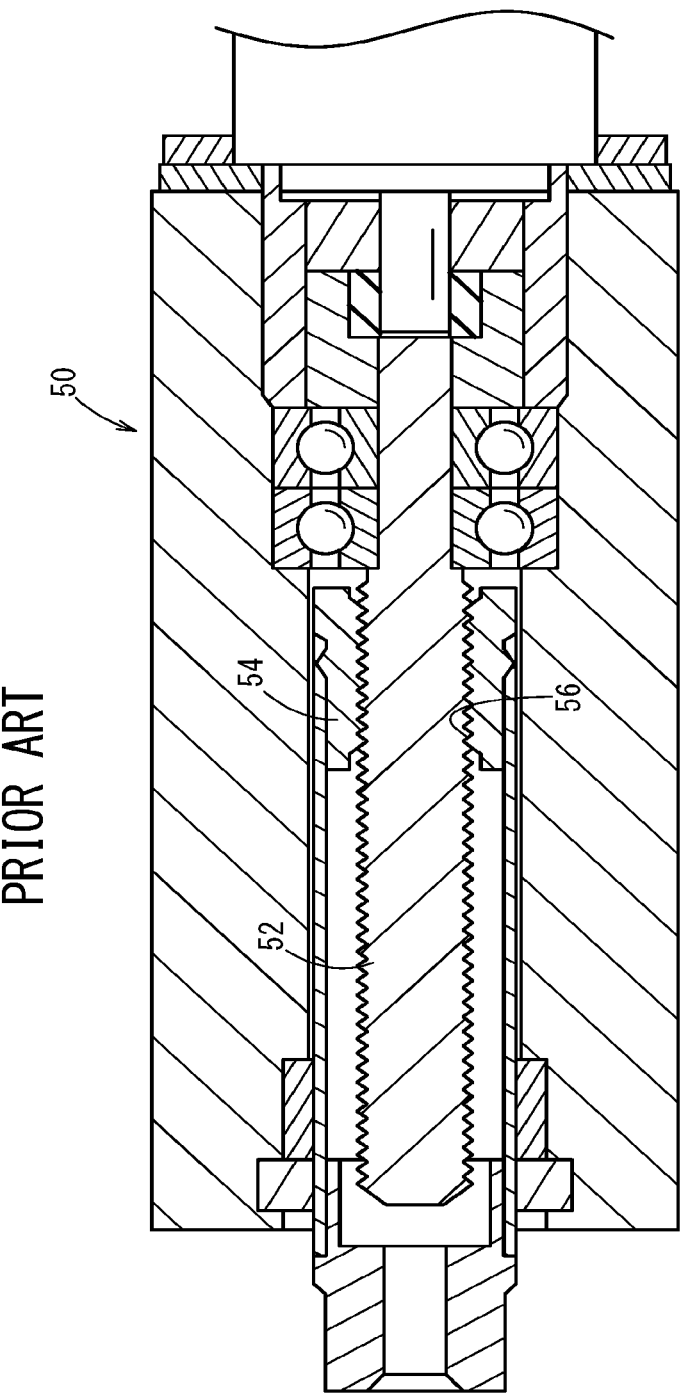
FIG. 7 is a partly sectional view of an electric actuator.

FIGS. 4A and 4B illustrate a case where a feed screw nut 26 for an electric actuator 50 (see FIG. 7) being an object is manufactured by incorporating the laminated nut 10 thereinto.

First, the thinned nuts 12 are screw-engaged with a cylindrical pitch control jig 28 on which a male thread 27 is formed in the same manner as in the feed screw shaft 52. In this case, the thinned nuts 12 are laminated by screw-engaging the thinned nuts 12 one by one with the male thread 27 of the pitch control jig 28 and by causing the adjoining thinned nuts 12 to be in close contact with each other.

Subsequently, one end side of the pitch control jig 28 is inserted into a through hole 32 of a tubular member 30, and the tubular member 30 is brought into abutment on one surface of a laminated body of the thinned nuts 12. Further, the other end side of the pitch control jig 28 is inserted into a through hole 36 of a block 34, and the block 34 is brought into abutment on the other surface of the laminated body of the thinned nuts 12.

Then, as shown by the arrow of the broken line, welding such as laser welding or the like is performed in the circumferential direction on the outer peripheral portions of the laminated body of the thinned nuts 12 to join the thinned nuts 12 to one another, so that the laminated nut 10 is manufactured. Further, an abutment portion between the laminated nut 10 and the tubular member 30 is joined by laser welding or the like, and an abutment portion between the laminated nut 10 and the block 34 is joined by laser welding or the like, whereby the feed screw nut 26 is completed. Incidentally, the welding on the outer peripheral portion of the laminated body is performed at, for example, a plurality of positions in the circumferential direction.

Figure 8:
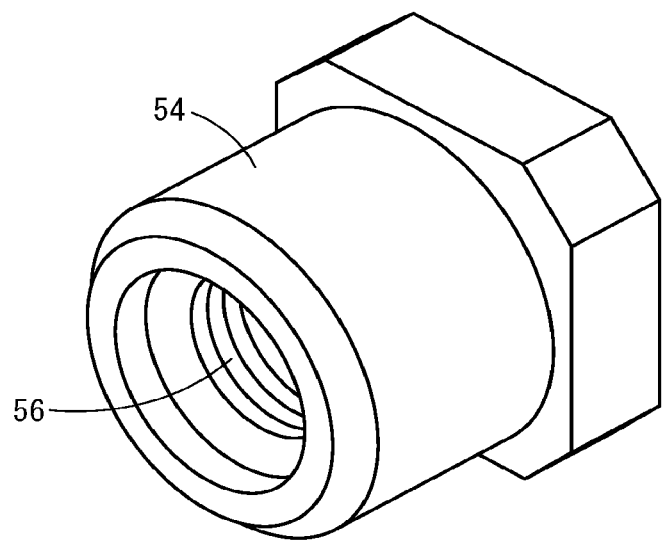
FIG. 8 is a perspective view of a feed screw nut in FIG. 7.

As a result, in place of the conventional feed screw nut 54 (see FIGS. 7 and 8), it becomes possible to mount on the electric actuator 50 the feed screw nut 26 including the laminated nut 10 according to the present embodiment. Incidentally, although the case of using the pitch control jig 28 which is a separate member from the feed screw shaft 52 has been described in the above description, the feed screw shaft 52 per se may be used as the pitch control jig 28.

Modifications of Present Embodiment

Figure 5A:
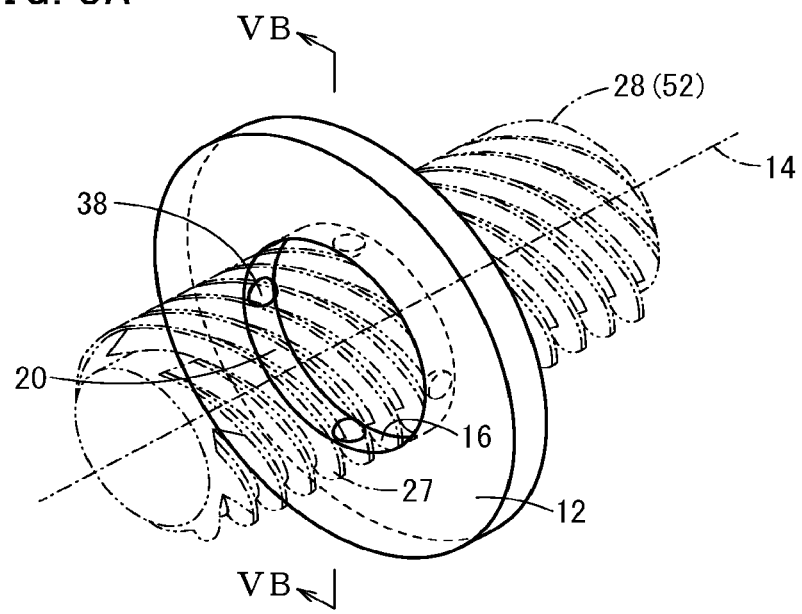
FIG. 5A is a perspective view illustrating another configuration of a laminated nut.
Figure 5B:
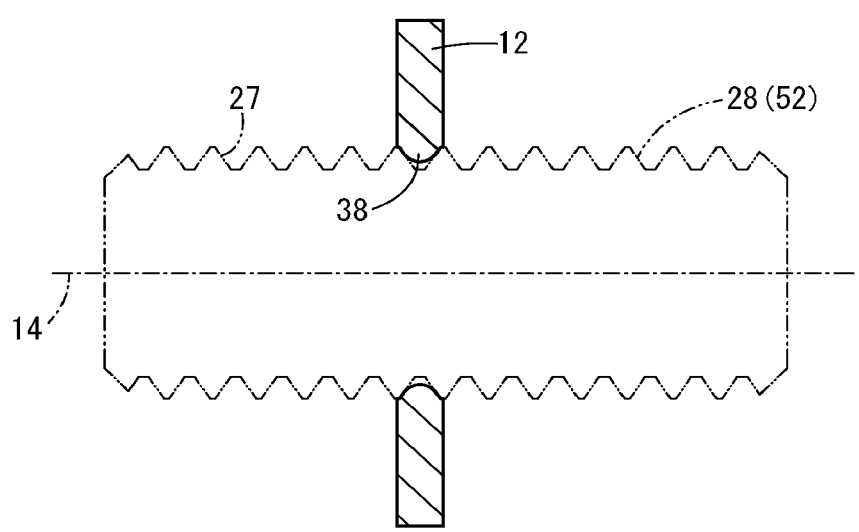
FIG. 5B is a sectional view taken along line VB-VB in FIG. 5A.

FIGS. 5A and 5B show a modification of the laminated nut 10 according to the present embodiment. For ease of description, FIGS. 5A and 5B illustrate only one thinned nut 12 and the pitch control jig 28 (or the feed screw shaft 52).

This modification illustrates a case where a screw thread 38 of a round screw is configured by hemispherical protrusions which are formed on an inner peripheral surface of the thinned nut 12 at predetermined angular intervals. Even in this case, by laminating thinned nuts 12 in the direction of the center axis 14 and by performing laser welding or the like on the outer peripheral surfaces of the thinned nuts 12, it is possible to manufacture a laminated nut 10 having a threaded portion 22 configured by the screw thread 38 of the round screw.

As described above, in the present embodiment, it is possible to employ as the shape of the screw threads 18, 38 any shape enabling the laminated nut 10 to be screwed on the feed screw shaft 52 which is used in combination with the laminated nut 10. That is, it is possible to perform the function of the laminated nut 10 even in the case where a screw thread of, for example, a trapezoidal shape or a rectangular shape is employed besides the shape of a conventional metric thread (standard screw).

Figure 6A:
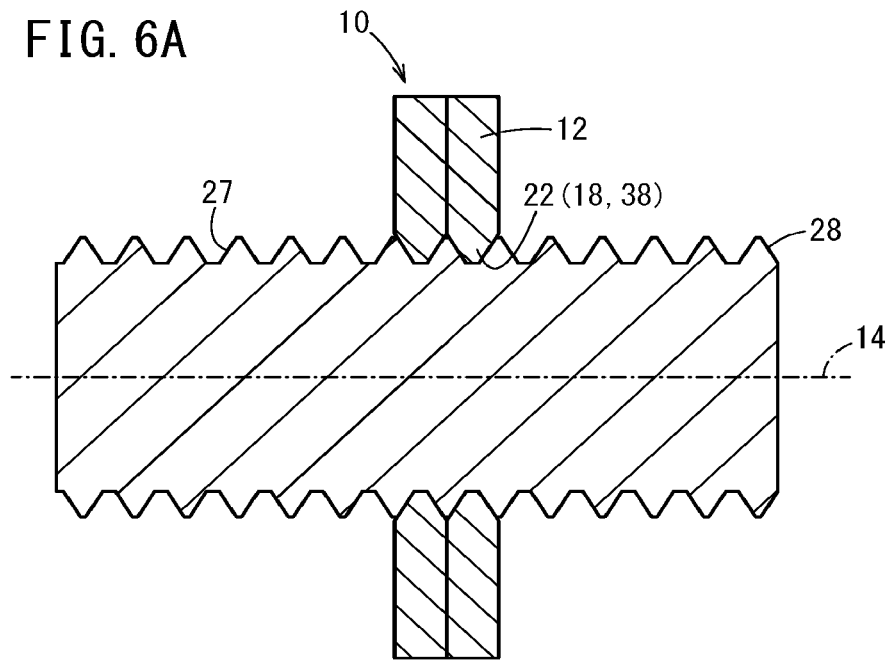
FIG. 6A is a sectional view illustrating the case where a laminated nut is manufactured in a backlashless state by using a pitch control jig.
Figure 6B:
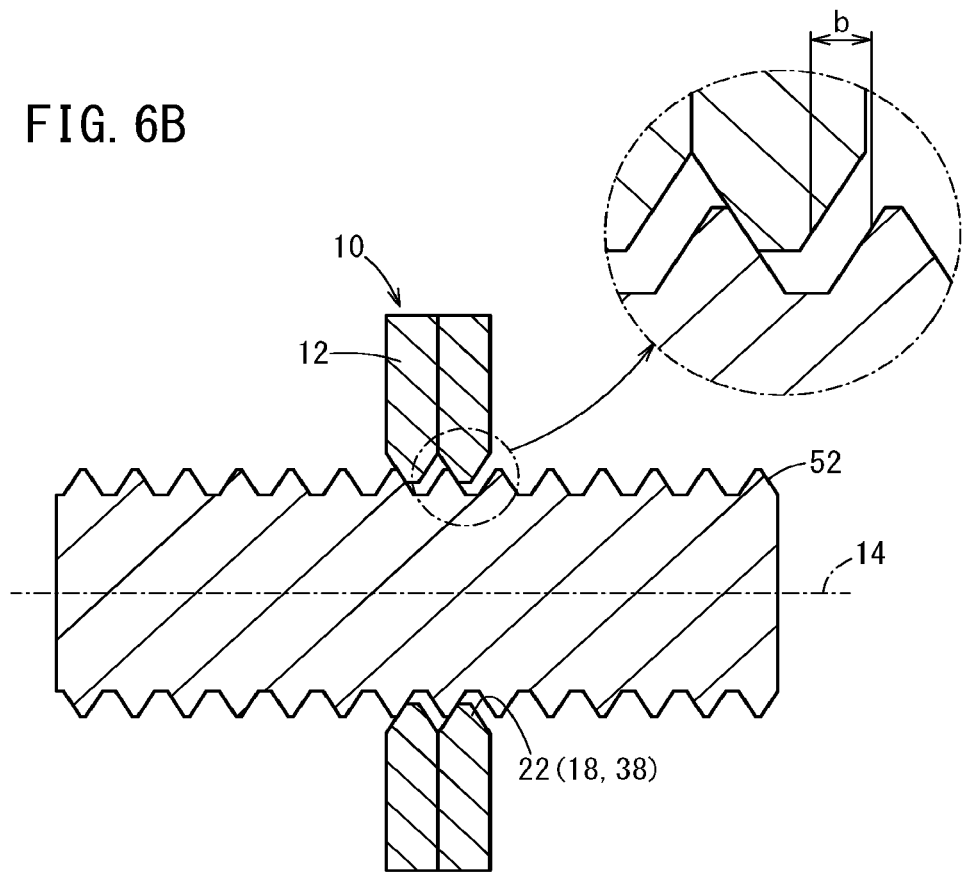
FIG. 6B is a sectional view illustrating the case where the laminated nut manufactured in the method of FIG. 6A is screw-engaged with a feed screw shaft.

FIGS. 6A and 6B show another modification of the laminated nut 10 according to the present embodiment. Incidentally, for the purpose of ease in description, FIG. 6A only illustrates two thinned nuts 12 and the pitch control jig 28, while FIG. 6B only illustrates the two thinned nuts 12 and the feed screw shaft 52.

As shown in FIG. 6A, the thinned nuts 12 having screw threads 18, 38 are screw-engaged with the male thread 27 of the pitch control jig 28. In this case, the thinned nuts 12 are screwed one by one for screw-engagement with the male thread 27. Thus, the thinned nuts 12 are laminated without any gap in the direction along the center axis 14, whereby the laminated nut 10 is formed. At this time, since axial force is generated between the thinned nuts 12, the thinned nuts 12 are laminated without any gap in a state of being screwed like a double nut. By the nuts 12 being in a laminated state like this, the laminated nut 10 can be accurately manufactured without any backlash. Incidentally, it is needless to say that the aforementioned welding is performed also on the laminated nut 10.

Then, as shown in FIG. 6B, the laminated nut 10 manufactured by the method of FIG. 6A is screw-engaged with, for example, a feed screw shaft 52 of a triangular screw thread which is smaller in diameter than the male thread 27 of the pitch control jig 28. In this case, because the diameter of the feed screw shaft 52 is smaller than the diameter of a threaded portion 22 of the laminated nut 10, a backlash b of a gap width in parallel to the center axis 14 occurs between the threaded portion 22 and the feed screw shaft 52. As mentioned above, because the laminated nut 10 is accurately manufactured in the backlashless state, when the laminated nut 10 is combined with the feed screw shaft 52, it is possible to set the backlash b to a desired size.

Further, in still another embodiment, there may be prepared in advance a plurality of pitch control jigs 28 whose male threads 27 differ in diameter (effective diameter, for example). In this case, one of the pitch control jigs 28 is selected in correspondence to the specifications of an electric actuator 50 having a feed screw shaft 52, and the thinned nuts 12 are screw-engaged with the male thread 27 of the selected pitch control jig 28. Even in this case, axial force is generated between the thinned nuts 12, and the thinned nuts 12 are laminated without any gap in a state of being screwed like a double nut. As a result, the laminated nut 10 is accurately manufactured in a backlashless state.

Subsequently, when the laminated nut 10 is screw-engaged with the feed screw shaft 52, the backlash b formed between the feed screw shaft 52 and the laminated nut 10 becomes an optimum backlash meeting the specifications of the electric actuator 50. In short, in the still another embodiment, by provision of the plural pitch control jigs 28 whose diameters are changed stepwise, it is possible to adjust the size of the backlash b stepwise. As a result, in a case where a certain degree of variation is allowed in the accuracy of the feed screw shaft 52 from the standpoint of mass productivity and cost, an optimum laminated nut 10 in accordance with the particular specifications can be accurately manufactured, and thus, it becomes easy to adjust the backlash b. That is, in the still another embodiment, it is possible to adjust the backlash b to an optimum backlash meeting the specifications of the electric actuator 50.

Further, in the present embodiment, the welding on the outer peripheral portions of the plate-shaped members 12 in the laminated state is not limited to the aforementioned laser welding. As a matter of course, it is possible to manufacture the laminated nut 10 by performing different welding such as resistance welding or the like.

Further, in the present embodiment, joining of the plate-shaped members 12 in the laminated state is not limited to any of various kinds of welding such as the aforementioned laser welding or the like. It is also possible to manufacture the laminated nut 10 by joining the plate-shaped members 12 in the laminated state by any other joining method such as adhesive, rivets or the like.

Advantageous Effects of Embodiment

As described hereinabove, according to the laminated nut 10 of the present embodiment, the laminated nut 10 is formed by laminating the thinned nuts 12 each with the screw threads 18, 38 protruding inward of the through hole 16. Accordingly, in the present embodiment, because no cutting step is required, it is possible to reduce the machining time and to reduce the manufacturing cost.

To explain this effect in more detail, instead of the conventional method in which the thread length depends on the feed amount in cutting, it is possible to easily assemble the laminated nut 10 by laminating as many thinned nuts 12 as the number thereof corresponding to the required thread length, in the present embodiment. Therefore, it is possible to obtain the laminated nuts 10 having various thread lengths as necessary from one type of thinned nut 12.

Further, in the present embodiment, because the thread length is not limited by the length of a cutting tool, it is possible to manufacture the laminated nut 10 by laminating a required number of the thinned nuts 12. Furthermore, because a protective coating is formed on each of the thinned nuts 12, the thickness of the protective coating becomes easy to control.

With the above configuration, in the laminated nut 10 according to the present embodiment, the laminated nuts 10 become easy to control, and the machining time is reduced, so that it is possible to manufacture the laminated nut 10 at a low cost.

Further, in the laminated nut 10, the screw threads 18, 38 are screw threads of a multi-start thread, and the spaces 20 are formed between the screw threads 18, 38 of each thinned nut 12 so that the screw threads 18, 38 do not mutually overlap in the direction along the center axis 14 of the laminated nut 10. Therefore, it is possible to form the screw threads 18 by plastically deforming the workpiece 24 into the thinned nut 12.

In this case, as long as the thickness L of each thinned nut 12 is equal to or less than the thread pitch P of the screw threads 18, 38, it is possible to easily form the screw threads 18, 38.

Further, in the present embodiment, by joining the thinned nuts 12 in the laminated state, it is possible to easily obtain the laminated nut 10 having a thread length sufficient to operate as the feed screw nut 26.

Specifically, the outer peripheral portions of the thinned nuts 12 are joined in a state that the thinned nuts 12 are laminated so that the screw threads 18, 38 are continuously connected in the direction along the center axis 14 of the laminated nut 10.

In this case, by joining the thinned nuts 12 in a state that the screw threads 18, 38 are screw-engaged with the pitch control jig 28 (or the feed screw shaft 52) with the male thread 27 formed thereon, it is possible to manufacture the laminated nut 10 while the thread pitch P is controlled with a sufficient degree of accuracy.

Further, because the screw threads 18, 38 of the thinned nuts 12 are screw-engaged with the male thread 27 of the pitch control jig 28, the thinned nuts 12 are laminated on the pitch control jig 28 without any gap along the center axis 14, so that it is possible to accurately manufacture the laminated nut 10 without any backlash.

Furthermore, in order that the backlash b formed between the laminated nut 10 and the feed screw shaft 52 when the laminated nut 10 is screw-engaged with the feed screw shaft 52 of the electric actuator 50 is adjusted to a predetermined backlash b in accordance with the specifications of the electric actuator 50, the screw threads 18, 38 of the thinned nuts 12 are screw-engaged with the male thread 27 of one pitch control jig 28 of the plurality of pitch control jigs 28, whereby the thinned nuts 12 are laminated without any gap relative to the one pitch control jig 28. Even in this case, it is possible to accurately manufacture the laminated nut 10 in a state in which no backlash occurs. Further, the laminated nut 10 is manufactured by selecting an appropriate pitch control jig 28 in accordance with the specifications of the electric actuator 50 into which the laminated nut 10 is incorporated as a feed screw nut, and by screw-engaging the thinned nuts 12 with the male thread 27 of the selected pitch control jig 28. Thus, when the laminated nut 10 as manufactured above is screw-engaged with the feed screw shaft 52 of the electric actuator 50, it is possible to adjust the backlash b formed between the laminated nut 10 and the feed screw shaft 52 to an optimum backlash in accordance with the particular specifications.

Thereafter, when the outer peripheral portions of the plate-shaped members 12 in the laminated state are joined by welding, the above laminated nut 10 can be obtained easily.

Incidentally, the present invention is not limited to the foregoing embodiment, and the present invention may, of course, take various configurations without departing from the gist of the present invention.

The invention claimed is:

1. A feed screw nut comprising a laminated nut which includes a plurality of plate-shaped members having through holes whose diameters are substantially same, the plate-shaped members being laminated so that the through holes are substantially coaxial with each other, the feed screw nut further comprising:
    a tubular member joined to one surface of the laminated nut to communicate with the through holes, the tubular member having a through hole which is larger in diameter than the through holes, and
    a block joined to another surface of the laminated nut to communicate with the through holes, the block having a through hole which is larger in diameter than the through holes,
    wherein:
    each of the plate-shaped members has a plurality of screw threads arranged at predetermined angular intervals, the screw threads protruding inward of the through hole; and
    in the laminated nut, outer peripheral portions of the plate-shaped members are joined together by welding in a state that the plate-shaped members are laminated so that screw threads of the plate-shaped members are continuously connected in an axial direction of the nut.

2. The feed screw nut according to claim 1, wherein:
    the screw threads are screw threads of a multi-start thread; and
    in each of the plate-shaped members, spaces are formed between the screw threads so that the screw threads do not mutually overlap in an axial direction of the laminated nut.

3. The feed screw nut according to claim 1, wherein:
    a thickness of each of the plate-shaped members is equal to or less than a thread pitch of each of the screw threads.

4. The feed screw nut according to claim 1, wherein outer peripheral portions of the plate-shaped members are joined together by welding to provide welds at said outer peripheral portions.

5. A method for manufacturing a feed screw nut comprising a laminated nut which includes a plurality of plate-shaped members having through holes whose diameters are substantially same, the plate-shaped members being laminated so that the through holes are substantially coaxial with each other,
    wherein each of the plate-shaped members has a plurality of screw threads arranged at predetermined angular intervals, the screw threads protruding inward of the through hole,
    the manufacturing method comprising:
    forming a laminated body of the plate-shaped members by screw-engaging a jig having a male thread formed thereon with the screw threads to laminate the plate-shaped members so that the through holes are substantially coaxial with each other and so that screw threads of the plate-shaped members are continuously connected in an axial direction of the laminated nut,
    inserting a tubular member into one end side of the jig to bring the tubular member into abutment on one surface of the laminated body, the tubular member having a through hole which is larger in diameter than the through holes,
    inserting a block into another end side of the jig to bring the block into abutment on another surface of the laminated body, the block having a through hole which is larger in diameter than the through holes,
    manufacturing the laminated nut by joining outer peripheral portions of the plate-shaped members together by welding, and completing the feed screw nut by joining an abutment portion between the laminated nut and the tubular member and by joining an abutment portion between the laminated nut and the block.

6. The method for manufacturing the feed screw nut according to claim 5, wherein:
the plate-shaped members are laminated without any gap on the jig in an axial direction by the screw threads being screw-engaged with the male thread.

7. The method for manufacturing the feed screw nut according to claim 6, wherein:
in order that a backlash formed between the laminated nut and a screw shaft of an object when the laminated nut is screw-engaged with the screw shaft is adjusted to a predetermined backlash in accordance with specifications of the object, the screw threads are screw-engaged with a male thread of one jig of a plurality of the jigs and the plate-shaped members are laminated without any gap relative to the one jig.

8. The method for manufacturing the feed screw nut according to claim 5, wherein the step of manufacturing the laminated nut by joining outer peripheral portions of the plate-shaped members together by welding comprises manufacturing the laminated nut by joining outer peripheral portions of the plate-shaped members together by welding performed at said outer peripheral portions.

* * * * *